United States Patent
Kageyama et al.

(10) Patent No.: US 10,867,456 B2
(45) Date of Patent: Dec. 15, 2020

(54) ABNORMALITY DIAGNOSTIC METHOD AND ABNORMALITY DIAGNOSTIC DEVICE FOR DRIVING FORCE CONTROL SYSTEM

(71) Applicant: Nissan Motor Co., Ltd., Yokohama (JP)

(72) Inventors: Yuzo Kageyama, Kanagawa (JP); Ryoji Kadono, Atsugi (JP)

(73) Assignee: Nissan Motor Co., Ltd., Yokohama (JP)

(*) Notice: Subject to any disclaimer, the term of this patent is extended or adjusted under 35 U.S.C. 154(b) by 167 days.

(21) Appl. No.: 16/302,123

(22) PCT Filed: May 27, 2016

(86) PCT No.: PCT/JP2016/065675
§ 371 (c)(1),
(2) Date: Nov. 16, 2018

(87) PCT Pub. No.: WO2017/203678
PCT Pub. Date: Nov. 30, 2017

(65) Prior Publication Data
US 2019/0188927 A1 Jun. 20, 2019

(51) Int. Cl.
*G07C 5/08* (2006.01)
*F02D 41/22* (2006.01)
(Continued)

(52) U.S. Cl.
CPC ........... *G07C 5/0808* (2013.01); *B60W 10/04* (2013.01); *B60W 10/06* (2013.01); *B60W 10/10* (2013.01);
(Continued)

(58) Field of Classification Search
CPC ..... G07C 5/0808; B60W 10/04; B60W 10/06; B60W 10/10; B60W 30/188;
(Continued)

(56) References Cited

U.S. PATENT DOCUMENTS 6,076,500 A * 6/2000 Clement ............. F02D 41/1497
123/362
6,459,979 B2 * 10/2002 Murakami ............ B60W 10/06
701/52
(Continued)

FOREIGN PATENT DOCUMENTS

DE 112014002955 T5 3/2016
JP 2010-43536 A 2/2010
(Continued)

*Primary Examiner* — Anne Marie Antonucci
*Assistant Examiner* — Sahar Motazedi
(74) *Attorney, Agent, or Firm* — Global IP Counselors, LLP

(57) ABSTRACT

An abnormality diagnostic method is provided for a driving force control system in which an automatic transmission is interposed between an engine and a drive wheel, and a target driving force that is transmitted to the drive wheel is calculated based on a driver's output request. The automatic transmission and the engine are controlled based on the target driving force. The abnormality diagnostic method includes calculating a target engine torque based on the target driving force, detecting an actual engine torque of the engine, and detecting an intake temperature of the engine. Upon determining the automatic transmission has been operating normally, abnormality diagnostic method determines an abnormality of the driving force control system exists that is caused by the engine upon determining a difference between the target engine torque and the actual engine torque has exceeded a predetermined threshold value.

5 Claims, 6 Drawing Sheets

(51) Int. Cl.
  *F02D 29/00* (2006.01)
  *B60W 10/04* (2006.01)
  *B60W 10/06* (2006.01)
  *B60W 10/10* (2012.01)
  *B60W 30/194* (2012.01)
  *B60W 50/04* (2006.01)
  *B60W 30/188* (2012.01)
  *B60W 50/02* (2012.01)
  *F02D 41/14* (2006.01)
  *F02D 41/18* (2006.01)

(52) U.S. Cl.
  CPC ........ *B60W 30/188* (2013.01); *B60W 30/194* (2013.01); *B60W 50/0205* (2013.01); *B60W 50/045* (2013.01); *F02D 29/00* (2013.01); *F02D 41/1497* (2013.01); *F02D 41/18* (2013.01); *F02D 41/22* (2013.01); *B60W 2510/0628* (2013.01); *B60W 2510/0676* (2013.01); *F02D 2200/04* (2013.01); *F02D 2200/0402* (2013.01); *F02D 2200/0414* (2013.01); *F02D 2200/101* (2013.01); *F02D 2200/1002* (2013.01); *F02D 2200/501* (2013.01)

(58) Field of Classification Search
  CPC ........... B60W 30/194; B60W 50/0205; B60W 50/045; B60W 2510/0628; B60W 2510/0676; F02D 29/00; F02D 41/1497; F02D 41/18; F02D 41/22; F02D 2200/04; F02D 2200/0402; F02D 2200/0414; F02D 2200/1002; F02D 2200/101; F02D 2200/501
  See application file for complete search history.

(56) References Cited

U.S. PATENT DOCUMENTS

| | | | |
|---|---|---|---|
| 2007/0026997 A1* | 2/2007 | Tohta | B60W 30/1884 477/107 |
| 2012/0108391 A1* | 5/2012 | Nagashima | B60K 6/48 477/176 |
| 2016/0138494 A1* | 5/2016 | Arikai | F02D 29/02 701/102 |

FOREIGN PATENT DOCUMENTS

| | | |
|---|---|---|
| JP | 2010-175063 A | 8/2010 |
| JP | 2010-236416 A | 10/2010 |

\* cited by examiner

ABNORMALITY DIAGNOSTIC METHOD AND ABNORMALITY DIAGNOSTIC DEVICE FOR DRIVING FORCE CONTROL SYSTEM

CROSS-REFERENCE TO RELATED APPLICATIONS

This application is a U.S. national stage application of International Application No. PCT/JP2016/065675, filed on May 27, 2016.

BACKGROUND

Field of the Invention

The present invention relates to a driving force control system in which an automatic transmission is interposed between an engine and drive wheels, and more specifically relates to the diagnosis of an abnormality in a driving force control system.

Background Information

As disclosed in Patent Document 1, as a driving force control system, a so-called power train torque demand control (PTD control), in which a target driving force to be transmitted to the drive wheels is obtained from a vehicle speed and a driver's output request based on an accelerator opening degree, etc., and an engine and an automatic transmission are controlled based on this target driving force, is known.

In addition, in Japanese Laid-Open Patent Application No. 2010-236416 (Patent Document 1), an estimated driving force is compared with a threshold value and an abnormality of the vehicle is determined according to the result thereof, as a method for determining an abnormality in which an acceleration of the vehicle becomes too high. Furthermore, at the time of an abnormality, in which the driving force cannot be normally estimated due to an abnormality of an actuator, or the like, an abnormality of the vehicle is determined by comparing an estimated engine torque with a threshold value.

SUMMARY

For example, during acceleration in a low-temperature state, since the oil viscosity is high, there is an insufficient rise in the hydraulic pressure that is supplied to the automatic transmission, and there are cases in which a transient response delay occurs in the shifting carried out by the automatic transmission, even though the driving force control system including the automatic transmission is operating normally. In such cases, if abnormalities of the driving force control system are determined using the driving force that is transmitted to the drive wheels, then, because of the delayed response of the automatic transmission, there is the risk that an abnormality will be erroneously determined, despite normal operation.

In view of such circumstances, an object of the present invention is to prevent an erroneous determination of an abnormality despite the normal operation of the driving force control system, due to a transient response delay in the shifting operation of an automatic transmission, thereby improving diagnostic accuracy.

The present invention relates to a driving force control system employing a so-called power train torque demand control (PTD control), in which a target driving force that is transmitted to the drive wheel is calculated based on a driver's output request, and an automatic transmission and an engine are controlled based on the target driving force.

In the present invention, an actual engine torque of the engine is detected, and an abnormality of the driving force control system is determined to exist caused by the engine upon determining a difference between a target engine torque and the actual engine torque has exceeded a predetermined threshold value.

That is, while the present invention relates to a driving force control system that employs a PTD control, the engine torque rather than the driving force that is transmitted to the drive wheel is used to determine abnormalities in the driving force control system, and, with the influence of a transmission ratio of the automatic transmission removed, an abnormality is determined when a difference between the target engine torque and the actual engine torque that exceeds a threshold value occurs. Thus, even when the shifting operation by the automatic transmission is temporarily delayed at the time of acceleration in a low-temperature state, or the like, it becomes possible to determine an abnormality accurately, with the adverse influence accompanying this delay in the shifting operation having been eliminated.

According to the present invention, it is possible to prevent an erroneous determination accompanying a transient response delay in the shifting operation of the automatic transmission, thereby carrying out an accurate abnormality diagnosis.

DETAILED DESCRIPTION OF THE EMBODIMENTS

The present invention will be described below with reference to the illustrated examples.

Figure 1:
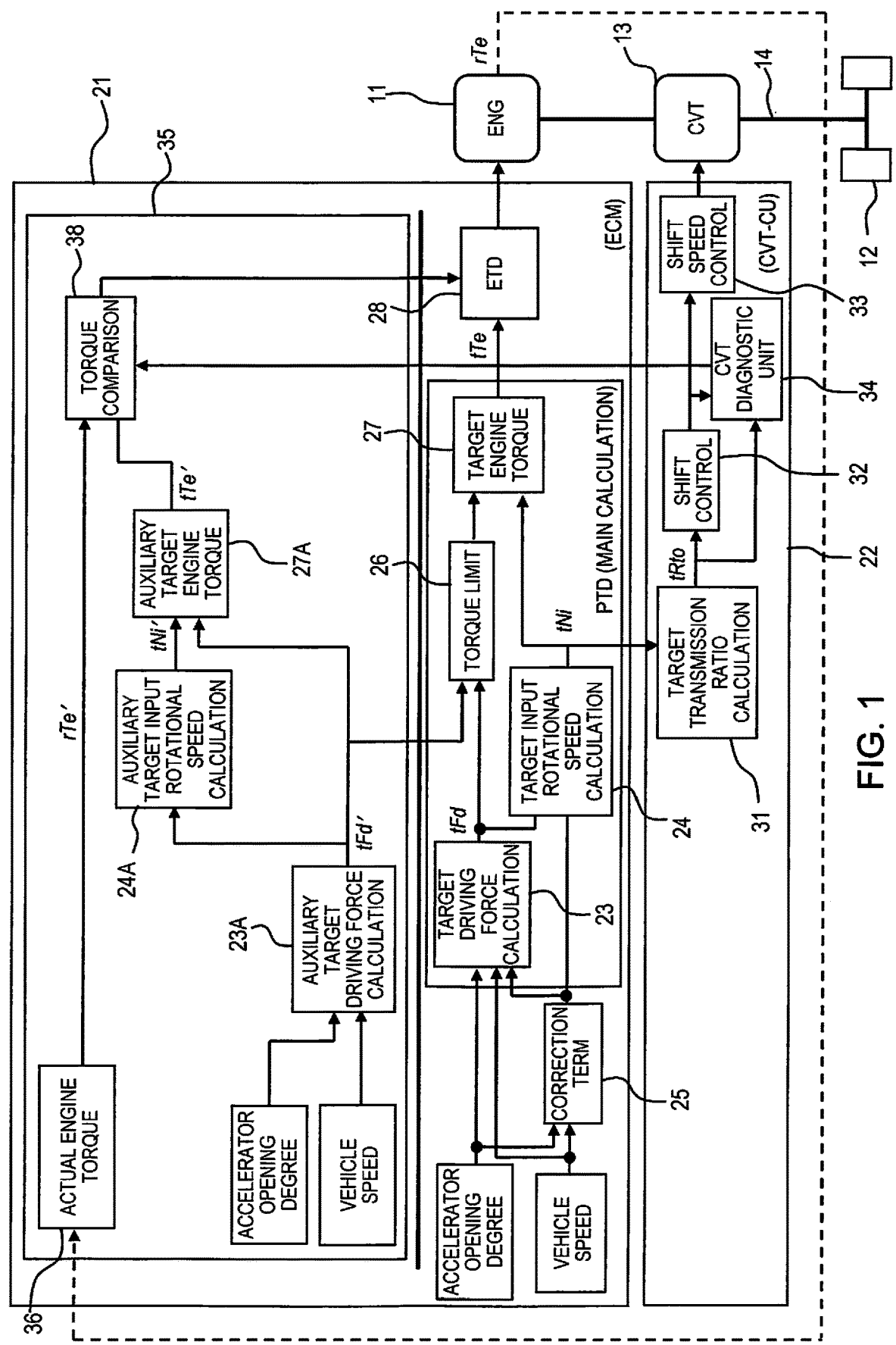
FIG. 1 is a block diagram illustrating an abnormality diagnostic device for a driving force control system according to a first embodiment of the present invention.
Figure 2:
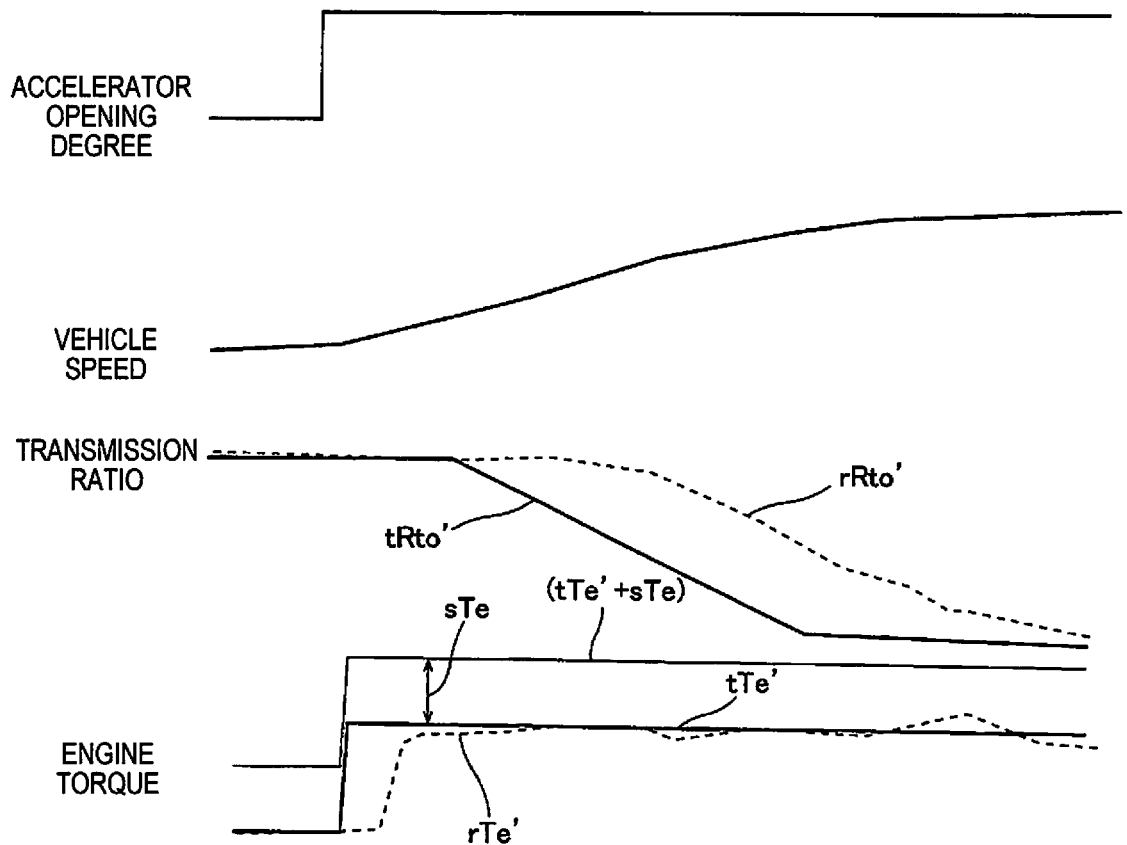
FIG. 2 is a timing chart at the time of acceleration according to the first embodiment.

FIGS. 1 and 2 illustrate a vehicle to which a driving force control system according to a first embodiment of the present invention is applied. In this driving force control system, an automatic transmission 13 is interposed between an engine 11 as a vehicle drive source and a drive wheel 12, and an automatic transmission 13 and the drive wheel 12 are connected via an axle 14. The engine 11 is an internal combustion engine that generates driving force by burning fuel, such as gasoline or diesel. A motor, a fuel cell, or the like can be used individually or in combination as the engine 11. In this embodiment, the automatic transmission 13 is a belt-type continuously variable transmission that is capable of changing gears steplessly and continuously. Because the structure of this belt-type continuously variable transmission is well-known, it will only be briefly described: a steel belt, having numerous steel pieces and two steel rings, is connected between a primary pulley that is connected to the engine 11 side and a secondary pulley that is connected to the drive wheels side, and the contact radius of the belt is changed to thereby change the transmission ratio in stepless fashion.

In the driving force control system, a plurality of controllers such as an engine control module 21 (ECM) and a transmission control unit 22 (CVT-CU) are connected by a system capable of bidirectional communication such as CAN communication to allow the exchange of necessary information. The engine control module 21 primarily controls the engine 11, and the transmission control unit 22 primarily controls the automatic transmission 13.

In the driving force control system, a so-called power train torque demand control (PTD control) is carried out as a means of controlling a power train that includes the engine 11 and the automatic transmission 13, in which, first, a target driving force tFd, which is a target value of a final driving force that is transmitted to the drive wheel 12, is calculated based on a vehicle speed and an accelerator opening degree of an accelerator pedal corresponding to a driver's output request, and the engine 11 and the automatic transmission 13 are controlled based on this target driving force tFd. That is, a target engine torque tTe, which is a target value of an output torque that is output by the engine 11, and a target transmission ratio tRto, which is a target value of a transmission ratio of the automatic transmission 13, are calculated based on the target driving force tFd, and the engine 11 is controlled toward the target engine torque tTe, and the automatic transmission 13 is controlled toward the target transmission ratio tRto. For the accelerator opening degree, for example, a signal from an accelerator opening degree sensor for detecting the opening degree of the accelerator pedal is used. The vehicle speed is detected by a vehicle speed sensor. Alternatively, the vehicle speed can be estimated using the transmission ratio and an input rotational speed (an engine rotation speed) of the automatic transmission.

The control performed by the engine control module 21 will now be described with reference to FIG. 1: the target driving force tFd is calculated by a target driving force calculation unit 23 based on the accelerator opening degree and the vehicle speed. A target input rotational speed tNi, which is the target value of the input rotational speed (that is, the engine rotation speed) of the automatic transmission 13 is calculated by a target input rotational speed calculation unit 24 based on the target driving force tFd.

A correction term calculation unit 25 obtains a correction term for realizing other performance requirements, such as the driving of auxiliary machines.

A torque limit unit 26 limits the upper limit of the engine torque such that the difference (tFd−tFd') between the target driving force tFd obtained by the target driving force calculation unit 23A and the target driving force tFd' obtained by an auxiliary target driving force calculation unit 24A, which will be described below, becomes a predetermined value or less. That is, by limiting the target driving force tFd so that an excessive difference from the original value (tFd') does not occur due to a correction by the correction term calculation unit 25, the generation of an erroneous diagnosis due to the correction by the correction term calculation unit 25 is prevented from occurring.

A target engine torque calculation unit 27 computes the target engine torque tTe within a range of limitation by the torque limit unit 26 based on the target input rotational speed tNi (the engine rotation speed), which is output to an engine control unit 28. That is, the target engine torque tTe is calculated such that the engine rotation speed becomes the target input rotational speed tNi.

The engine control unit 28 controls a throttle opening degree (in the case of a gasoline engine), the fuel injection amount (in the case of a diesel engine), and the like, based on the target engine torque tTe.

The control that is carried out by the transmission control unit 22 will now be described: a target transmission ratio calculation unit 31 computes a target transmission ratio tRto corresponding to a target value of the transmission ratio of the automatic transmission 13 from the target input rotational speed tNi and the vehicle speed. A transmission control unit 32 controls the shifting of the automatic transmission 13 based on the target transmission ratio tRto. A shift speed control unit 33 controls the speed of shifting by the transmission control unit 32.

In addition, rotation sensors for detecting a shaft rotation speed are provided on an input side and an output side of the automatic transmission (CVT) 13, and, in a CVT diagnostic unit 34, for example, the actual transmission ratio that is calculated from the detected input side and output side shaft rotation speeds is compared with the target transmission ratio tRto, and it is determined that the automatic transmission 13 is operating normally when the difference is within a predetermined range. Normal operation can be determined by including other diagnoses as well.

A control content of an abnormality determination unit 35 provided in the engine control module 21 will now be described. In the present embodiment, in order to prevent an erroneous diagnosis caused by a temporary delayed response of the shifting operation even when the CVT diagnostic unit 34 has determined that the automatic transmission 13 is operating normally, an abnormality of the driving force control system caused by the engine 11 is determined based on the target engine torque tTe and the actual engine torque rTe.

Specifically, an auxiliary target driving force calculation unit 23A computes the target driving force tFd' based on the accelerator opening degree and the vehicle speed, in the same manner as the target driving force calculation unit 23 described above. In this embodiment, the auxiliary target driving force calculation unit 23A is provided and the target driving force tFd' used for abnormality diagnosis is obtained separately; however, the auxiliary target driving force calculation unit 23A can be omitted, and the target driving force tFd described above can be used for the abnormality diagnosis without modification.

A target input rotational speed tNi', which is the target value of the input rotational speed (that is, the engine rotation speed) of the automatic transmission 13, is calculated by an auxiliary target input rotational speed calculation unit 24A based on the target driving force tFd', etc., in the same manner as the target input rotational speed calculation unit 24 described above. It is possible to omit the auxiliary target input rotational speed calculation unit 24A and to use the target input rotational speed tNi calculated by the target input rotational speed calculation unit 24 described above for the abnormality diagnosis.

A target engine torque tTe' is calculated by an auxiliary target engine torque calculation unit 27A (a target engine torque calculation unit) based on the target driving force tFd', the target input rotational speed tNi', and the like. It is possible to omit the auxiliary target engine torque calculation unit 27A and to use the target engine torque tTe calculated by the target engine torque calculation unit 27 described above for the abnormality diagnosis.

In an actual engine torque detection unit 36, an actual engine torque rTe', which is the output torque of the engine 11, is detected. This actual engine torque rTe' is calculated by taking into consideration an ignition timing, an EGR rate, and a fuel injection timing, in addition to an intake air amount that is detected by, for example, an airflow meter.

A torque comparator 38 compares the actual engine torque rTe' and the target engine torque tTe', and when the difference between the two exceeds a predetermined threshold value sTe, it is determined that there is an abnormality of the driving force control system that is caused by the engine 11. Specifically, a predetermined diagnostic threshold value sTe, which is set in advance, is added to the target engine torque tTe', and this sum (tTe'+sTe) is compared with the actual engine torque rTe'. An abnormality is then determined if the actual engine torque rTe exceeds the sum (tTe'+sTe) mentioned above. For example, an abnormality is determined when a throttle malfunction, an abnormal calculation value, etc., occurs. When an abnormality is determined, a corresponding abnormality diagnosis code (DTC) is stored. A failsafe operation mode is executed according to the abnormality diagnosis code stored in this manner, and the passenger is notified of the abnormality by using a display or a sound.

The threshold value sTe described above is a value that has been preset by experiment or simulation, taking into consideration the difference that occurs between the target engine torque tTe and the actual engine torque rTe', when an abnormality occurs in the driving force control system caused by the engine, such as a throttle malfunction, an abnormal calculated value, etc. Although the actual engine torque rTe' fluctuates slightly relative to the target engine torque tTe' even in a normal vehicle operating state, as illustrated in FIG. 2, the threshold value sTe described above should be set between a MIN value that ensures a certain degree of largeness and a MAX value that ensures a degree of smallness (for example, 0.2 G of acceleration) as a failsafe, i.e., to an extent to which the driver is able to easily manage using brakes, etc., when a drive torque that is greater than the vehicle requirement is generated, when an abnormality occurs in the driving force control system, so that such slight fluctuations do not result in an erroneous abnormality diagnosis. In addition, the threshold value is set to a value that is less than the difference (absolute value) between the actual engine torque rTe' and the target engine torque tTe' that is generated in the case of an abnormality in the driving force control system caused by the engine, such that a case of an abnormality in the driving force control system caused by the engine, such as a throttle malfunction, an abnormal calculated value, etc., is reliably diagnosed as an abnormality.

In this embodiment, in order to determine a type of abnormality in which the actual engine torque rTe' becomes excessively large relative to the target engine torque tTe', a threshold value sTe (an absolute value) is added to the target engine torque tTe', and an abnormality is determined when the actual engine torque rTe' exceeds the sum (tTe'+sTe); however, it is also possible to determine a type of abnormality in which the actual engine torque rTe' becomes too small relative to the target engine torque tTe'. In this case, the threshold value sTe (a positive value) is subtracted from the target engine torque tTe', and an abnormality is determined when the actual engine torque rTe' falls below this subtracted value (tTe'−sTe). In addition, the two can be combined in order to determine both types of abnormalities, in which the actual engine torque rTe' becomes too large or too small, relative to the target engine torque tTe'.

Here, in the torque comparator 38 described above, an intake temperature of the engine is detected or estimated, and the abnormality diagnosis determination process is corrected based on the intake temperature, such that an erroneous abnormality diagnosis is not performed due to a variation of the engine torque in an extremely low temperature state. Specifically, at the time of extremely low temperature states when the intake temperature is extremely low, a correction is made in a direction in which the diagnostic threshold value sTe becomes larger, in order to prevent an erroneous determination of an abnormality even though the driving force control system is operating normally. That is, the target engine torque tTe' or the threshold value sTe is corrected toward the increasing side or the actual engine torque rTe' is corrected toward the decreasing side.

Figure 3:
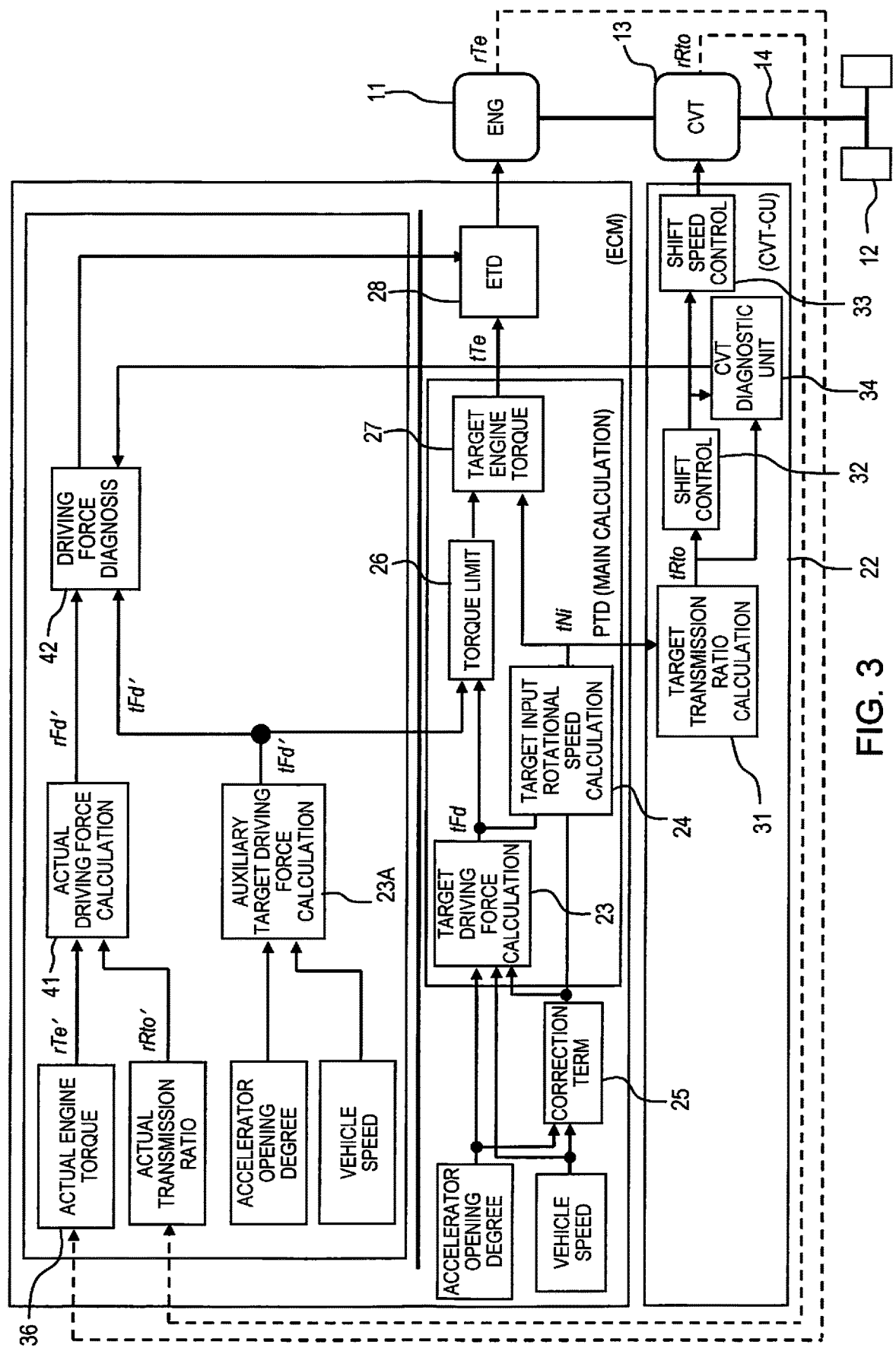
FIG. 3 is a block diagram illustrating an abnormality diagnostic device for a driving force control system according to a comparative example.
Figure 4:
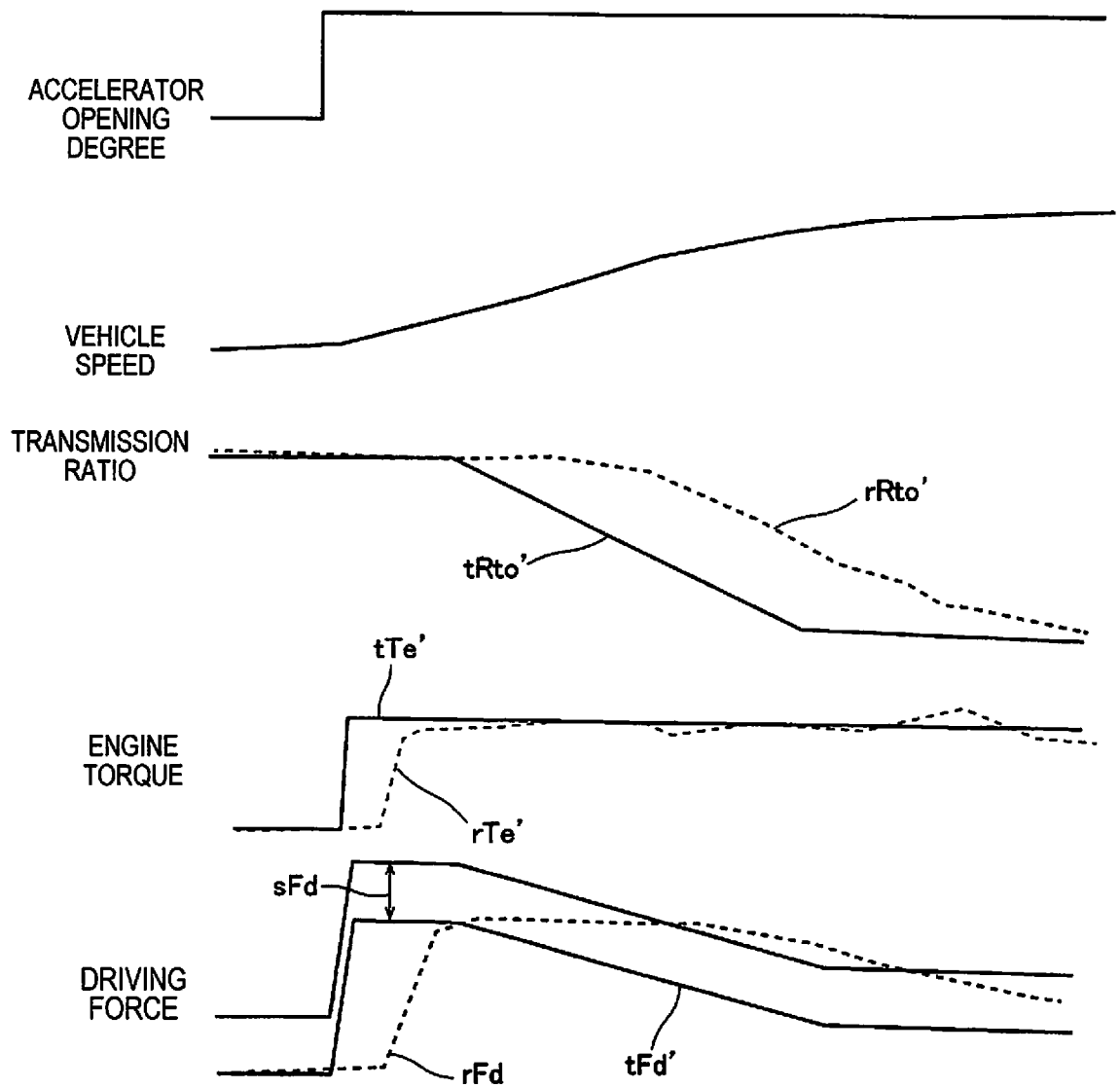
FIG. 4 is a timing chart at the time of acceleration according to a comparative example.

FIG. 3 and FIG. 4 illustrate an abnormality diagnostic device for a driving force control system according to a comparative example. The same constituent elements as the first embodiment have been assigned the same reference symbols and redundant descriptions have been appropriately omitted.

In this comparative example, an actual transmission ratio rRto' is detected or estimated, and an actual driving force calculation unit 41 calculates an actual driving force rFd' based on the actual engine torque rTe' and the actual transmission ratio rRto'. A driving force diagnostic unit 42 then carries out an abnormality diagnosis based on a comparison between the actual driving force rFd' and the target driving force tFd'. Specifically, a value (tFd'+sFd) obtained by adding the target driving force tFd and a diagnostic threshold value sFd that is set in advance is compared with the actual driving force rFd', and an abnormality is diagnosed when the actual driving force rFd' exceeds the sum (tFd'+sFd), as illustrated in FIG. 4.

The difference between the operations of the present embodiment and the comparative example will be described with reference to FIGS. 2 and 4, using the example of an acceleration of a vehicle in which the accelerator opening degree increases.

During acceleration when the accelerator pedal opening degree increases due to an accelerator pedal depression operation by the driver, the vehicle speed increases while the transmission ratio decreases. At this time, there are cases in which the actual transmission ratio rRto' transiently deviates from the target transmission ratio tRto', even though the automatic transmission 13 itself is operating normally, due, for example, to a delay in the rise of the hydraulic pressure that is supplied to the primary side of the automatic transmission 13 during low-temperature conditions.

Here, in the comparative example shown in FIG. 4, the target transmission ratio tRto' is used for the calculation of the target driving force tFd', and the actual transmission ratio rRto' is used for the calculation of the actual driving force rFd; therefore, there is the risk that, due to the influence of the deviation between the actual transmission ratio rRto' and the target transmission ratio tRto', the actual driving force rFd' will exceed the sum (tFd'+sFd) even though the driving force control system including the engine 11 and the automatic transmission 13 is operating normally.

In contrast, in the present embodiment shown in FIG. 2, the engine torque, rather than the driving force, is used for the abnormality diagnosis, even though the vehicle employs a power train torque demand control (PTD control), which uses the target driving force; specifically, an abnormality is diagnosed based on the target engine torque tTe' and the actual engine torque rTe', and, because the actual transmission ratio rRto' is not used for calculating the target engine torque tTe' and the actual engine torque rTe', it is possible to carry out diagnosis with the adverse effect of the transmission ratio removed. Therefore, even in a situation in which the actual transmission ratio rRto' transiently deviates from the target transmission ratio tRto', even though the automatic transmission 13 is operating normally, it is possible to inhibit the development of or prevent situations in which an abnormality is erroneously determined, thereby improving the diagnostic accuracy.

Figure 5:
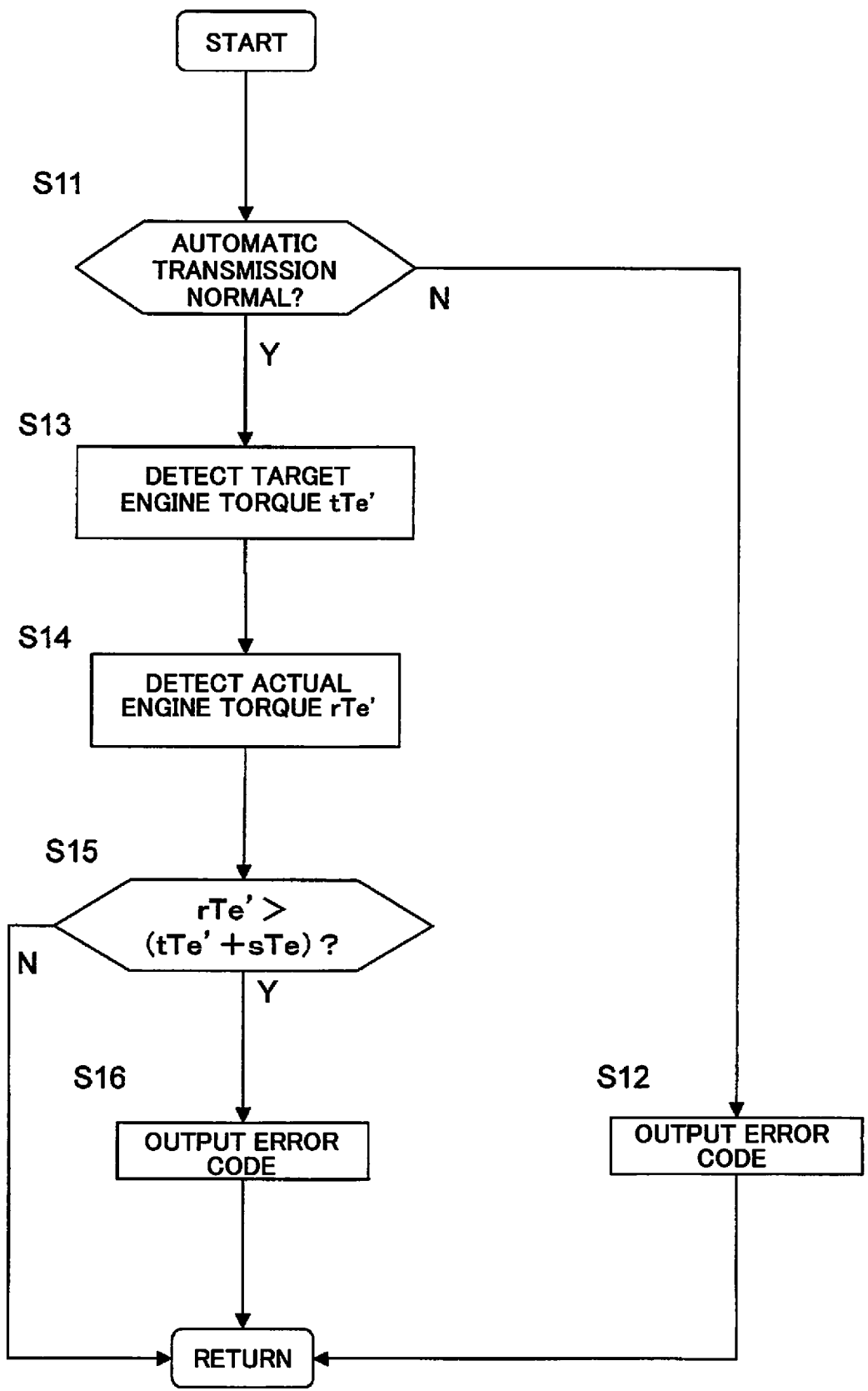
FIG. 5 is a flowchart illustrating a control flow of an abnormality diagnosis according to the present embodiment.

FIG. 5 is a flowchart illustrating a control flow of an abnormality diagnosis according to the present embodiment, and this routine is repeatedly executed at extremely short intervals (for example, every 10 ms).

In Step S11, it is determined whether or not the automatic transmission 13 is operating normally in the CVT diagnostic unit 34. In this determination, rotation sensors for detecting the shaft rotation speed are provided on the input side and the output side of the automatic transmission 13, and the actual transmission ratio that is calculated from the detected input side and output side shaft rotation speeds is compared with the target transmission ratio tRto, and it is determined that the automatic transmission 13 is operating normally when the difference is within a predetermined range. Normal operation can be determined by including other diagnoses as well. Additionally, the determination result of the abnormality determination of the automatic transmission is output as a flag. If the automatic transmission 13 is not operating normally, the process proceeds to Step S12, a corresponding error code is output, and the present routine is ended. In Step S13, a target engine torque tTe' is calculated by the auxiliary target engine torque calculation unit 27A described above. In Step S14, the actual engine torque rTe' is detected by the actual engine torque detection unit 36. In Step S15, the torque comparator 38 determines whether a difference between the target engine torque tTe and the actual engine torque rTe' that exceeds a predetermined threshold value sTe has occurred. If this difference has occurred, then an abnormality is determined to exist, and the process proceeds to Step S16, where a corresponding error code is output, and the present routine is ended.

In this manner, in the present embodiment, when the automatic transmission 13 is operating normally, an abnormality of the driving force control system is determined based on the engine torque; therefore, it is possible to reliably prevent a temporary response delay of the shifting operation in a normally operating automatic transmission 13 from being diagnosed as an abnormality.

A second embodiment of the present invention will now be described with reference to FIG. 6. In the three gear ranges, the transmission ratio, and the engine torque on the lower side of the figure, solid lines represent the target values (or the sums), and broken lines represent the estimated values (the actual gear range, the actual transmission ratio, the actual engine torque).

In the first embodiment above, a belt-type continuously variable transmission is used as the automatic transmission 13, but in this second embodiment, a stepped automatic transmission is used as the automatic transmission 13. Even when such a stepped automatic transmission is used, there are cases in which the actual transmission ratio rRto' transiently deviates significantly from the target transmission ratio tRto' during an acceleration of the vehicle, even though the automatic transmission 13 itself is operating normally, in the same manner as in the first embodiment in which a continuously variable transmission is used. For example, in order to realize the target driving force tFd, in the case of a control to transmit a target gear range from the engine control module 21 to the transmission control unit 22, there are cases in which the actual gear range does not move in accordance with the target gear range, even if malfunctions are excluded. These are, for example, cases in which the transmission control unit 22 temporarily ignores a request from the engine control module 21 in order to protect the unit, or cases in which sufficient hydraulic pressure has not been ensured for the automatic transmission to carry out shifting.

Figure 6:
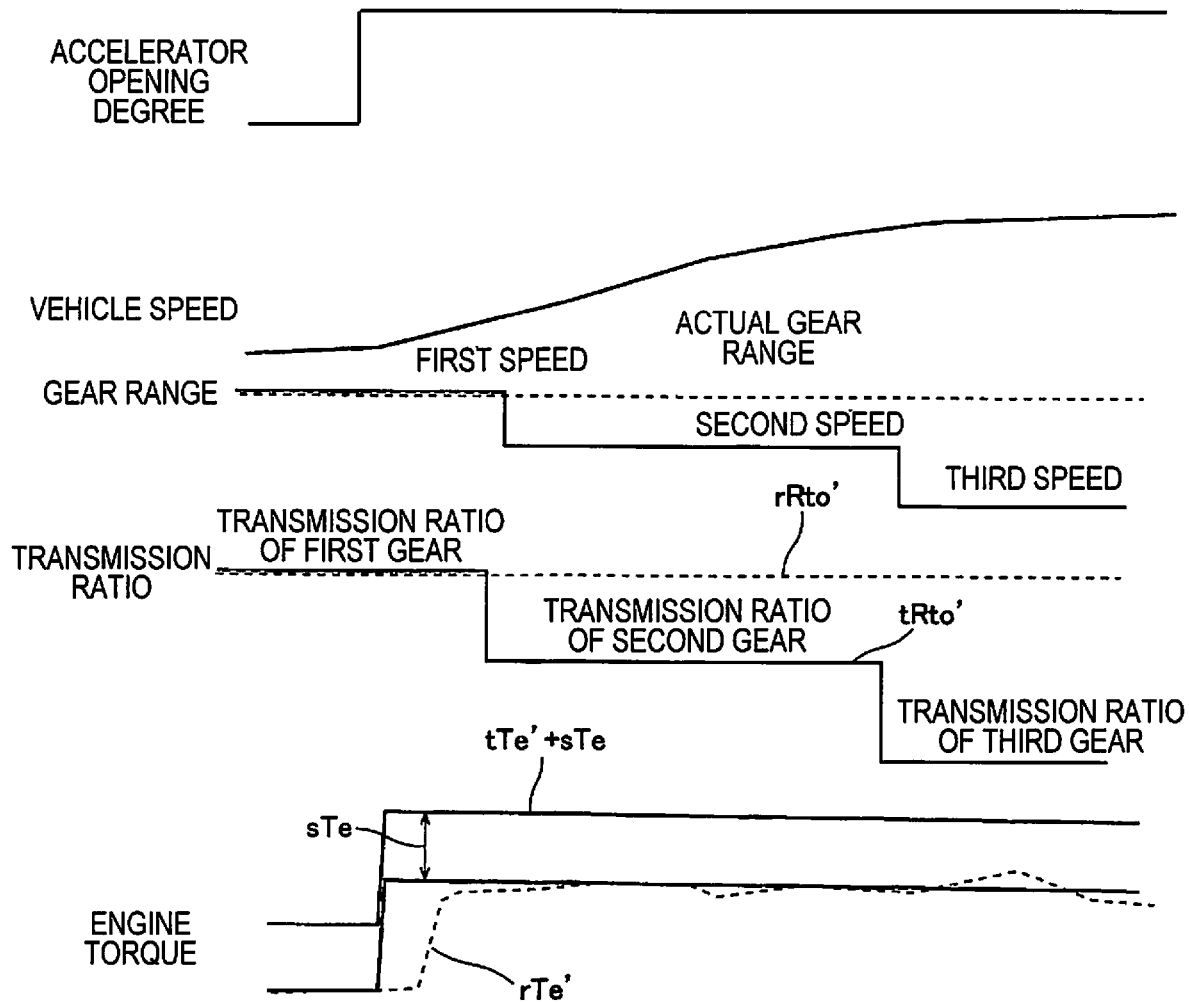
FIG. 6 is a timing chart at the time of acceleration of an abnormality diagnostic device for a driving force control system according to a second embodiment of the present invention.

In such cases, if the actual driving force rFd' is estimated by calculating from the actual transmission ratio rRto', there is the risk that an abnormality will be erroneously diagnosed even though the stepped automatic transmission is operating normally, due to the influence of the deviation of the actual transmission ratio rRto' with respect to the target transmission ratio tRto', as illustrated in FIG. 6.

In the present embodiment, as in the first embodiment described above, an abnormality diagnosis is carried out based on the engine torque, and the influence of the transmission ratio is removed; therefore, even if the actual transmission ratio rRto' were to temporarily deviate from the target transmission ratio tRto', the actual engine torque rTe' will not greatly deviate from the above-described sum (tTe'+sTe), and it is possible to improve the diagnostic accuracy by preventing or inhibiting the development of situations in which an abnormality is erroneously determined.

The present invention has been explained based on specific embodiments described above, but the present invention is not limited to the foregoing embodiments, and various modifications and changes are included therein. For example, in the embodiments described above, the present invention is applied to a type of abnormality in which the acceleration becomes greater than a target value, but the present invention can be similarly applied to a type of abnormality in which a deceleration falls below a target value.

The invention claimed is:

1. An abnormality diagnostic method for a driving force control system in which an automatic transmission is interposed between an engine and a drive wheel, and a target driving force that is transmitted to the drive wheel is calculated based on a driver's output request, and the automatic transmission and the engine are controlled based on the target driving force, the abnormality diagnostic method comprising:
   calculating a target engine torque based on the target driving force;
   detecting an actual engine torque of the engine;
   detecting an intake temperature of the engine;
   setting a predetermined threshold value in advance;
   increasing the predetermined threshold value upon determining that the intake temperature is below a prescribed temperature; and
   determining that an abnormality of the driving force control system caused by the engine exists upon determining that the automatic transmission has been operating normally and a difference between the target engine torque and the actual engine torque has exceeded the predetermined threshold value.

2. The abnormality diagnostic method as recited in claim 1, further comprising
   performing an operation to prevent a temporary response delay of a shifting operation in the automatic transmission in response to the determining of the abnormality of the driving force control system that is caused by the engine.

3. The abnormality diagnostic method as recited in claim 1, wherein
the actual engine torque is calculated based on a detected value of an intake air amount.

4. An abnormality diagnostic method for a driving force control system in which an automatic transmission is interposed between an engine and a drive wheel, and a target driving force that is transmitted to the drive wheel is calculated based on a driver's output request, and the automatic transmission and the engine are controlled based on the target driving force, the abnormality diagnostic method comprising:
calculating a target engine torque based on the target driving force;
detecting an actual engine torque of the engine;
detecting an intake temperature of the engine;
setting a predetermined threshold value in advance;
increasing the predetermined threshold value upon determining that the intake temperature is below a prescribed temperature; and
determining that an abnormality of the driving force control system caused by the engine exists upon determining that the automatic transmission has been operating normally and the actual engine torque exceeds a sum obtained by adding the predetermined threshold value to the target engine torque.

5. An abnormality diagnostic device for a driving force control system in which an automatic transmission is interposed between an engine and a drive wheel, and a target driving force that is transmitted to the drive wheel is calculated based on a driver's output request, and the automatic transmission and the engine are controlled based on the target driving force, the abnormality diagnostic device comprising:
an engine control module including a target engine torque calculation unit that calculates a target engine torque of the engine based on the target driving force;
a torque comparator that increases a predetermined threshold value upon determining that an intake temperature is below a prescribed temperature, and
the engine control module further including an abnormality determination unit that detects an actual engine torque of the engine, and
the abnormality determination unit being configured to determine that an abnormality of the driving force control system caused by the engine exists upon determining that the automatic transmission has been operating normally and a difference between the target engine torque and the actual engine torque has exceeded the predetermined threshold value.

* * * * *